UNITED STATES PATENT OFFICE.

CARL HEIDENREICH, OF LEVERKUSEN, NEAR COLOGNE, GERMANY, ASSIGNOR TO FARBENFABRIKEN VORM. FRIEDR. BAYER & CO., OF ELBERFELD, GERMANY, A CORPORATION OF GERMANY.

BLUE WOOL-DYE.

1,025,267.      Specification of Letters Patent.      Patented May 7, 1912.

No Drawing.      Application filed September 12, 1911. Serial No. 648,996.

*To all whom it may concern:*

Be it known that I, CARL HEIDENREICH, doctor of philosophy, chemist, citizen of the German Empire, residing at Leverkusen, near Cologne, Germany, have invented new and useful Improvements in Blue Wool-Dye, of which the following is a specification.

My invention relates to the manufacture and production of a new and valuable azo dye having the formula:

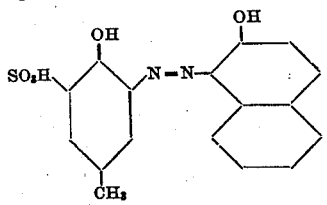

It can be obtained by combining the diazo compound of 4-methyl-2-aminophenol-6-sulfonic acid with beta-naphthol.

My new dye is after being dried and pulverized in the shape of its sodium salt a violet powder soluble in water with a blue coloration. Blue fast shades on wool are obtained by dyeing my new azo dye according to the one bath process in the presence of a chrome mordant.

In order to illustrate the new process more fully the following example is given, the parts being by weight:—20.3 parts of 4-methyl-2-aminophenol-6-sulfonic acid are dissolved in 200 parts of water and 12 parts of caustic soda lye of 33 per cent. The solution is cooled to 10° C. acidulated with hydrochloric acid (1.19 spec. gravity) and diazotized with 6.9 parts of sodium nitrite. The yellow diazo solution is then added to a solution prepared from 14.5 parts of beta-naphthol in 200 parts of water, 12 parts of caustic soda lye (30 per cent.) and 280 parts of a 10 per cent. soda solution. The mixture is stirred and heated during 4–5 hours to 40–50° C. The dye is filtered off, pressed and dried. It yields upon reduction with stannous chlorid and hydrochloric acid 4-methyl-2-aminophenol-6-sulfonic acid and 1-amino-2-naphthol.

Prepare the dye-bath with 4 per cent. of the dye: 4-methyl-2-aminophenol-6-sulfonic acid+beta-naphthol, bring to the boil, add 2 per cent. of potassium bichromate, enter the wool at 60–80° C., bring to the boil, boil for ¾ hour and add slowly 2–3 per cent. of acetic acid and continue boiling for 1–1½ hours. A deep dark blue fast shade is thus obtained.

I claim:—

The herein described new azo dye having the formula:

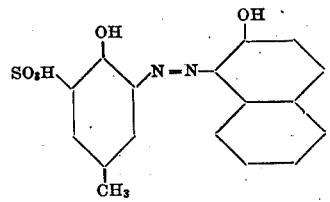

which is after being dried and pulverized in the shape of its sodium salt a violet powder soluble in water with a blue coloration; yielding upon reduction with stannous chlorid and hydrochloric acid 4-methyl-2-aminophenol-6-sulfonic acid and 1-amino-2-naphthol; and dyeing wool in the presence of a chrome mordant according to the one-bath method fast blue shades, substantially as described.

In testimony whereof I have hereunto set my hand in the presence of two subscribing witnesses.

CARL HEIDENREICH. [L. S.]

Witnesses:
    L. NUFER,
    ALBERT F. NUFER.